US007610315B2

(12) United States Patent
Chang et al.

(10) Patent No.: US 7,610,315 B2
(45) Date of Patent: Oct. 27, 2009

(54) SYSTEM AND METHOD OF DETERMINING AND RECOMMENDING A DOCUMENT CONTROL POLICY FOR A DOCUMENT

(75) Inventors: Walter Chang, San Jose, CA (US); Larry Masinter, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 185 days.

(21) Appl. No.: 11/470,533

(22) Filed: Sep. 6, 2006

(65) Prior Publication Data

US 2008/0059448 A1     Mar. 6, 2008

(51) Int. Cl.
*G06F 12/00* (2006.01)
*G06F 17/30* (2006.01)

(52) U.S. Cl. ....................................... 707/200
(58) Field of Classification Search ............... None
See application file for complete search history.

(56) References Cited

U.S. PATENT DOCUMENTS

| | | | | |
|---|---|---|---|---|
| 5,778,363 | A * | 7/1998 | Light | 705/5 |
| 6,185,576 | B1 * | 2/2001 | McIntosh | 707/200 |
| 6,466,932 | B1 * | 10/2002 | Dennis et al. | 707/3 |
| 6,473,851 | B1 * | 10/2002 | Plutowski | 713/1 |
| 6,553,365 | B1 * | 4/2003 | Summerlin et al. | 707/2 |
| 7,146,361 | B2 * | 12/2006 | Broder et al. | 707/5 |
| 2003/0130993 | A1 * | 7/2003 | Mendelevitch et al. | 707/3 |
| 2004/0049498 | A1 * | 3/2004 | Dehlinger et al. | 707/3 |
| 2005/0076030 | A1 * | 4/2005 | Hada et al. | 707/9 |
| 2005/0182756 | A1 * | 8/2005 | Eppley et al. | 707/3 |
| 2005/0289150 | A1 * | 12/2005 | Kudo | 707/10 |
| 2006/0031923 | A1 * | 2/2006 | Kanai | 726/1 |
| 2006/0143464 | A1 * | 6/2006 | Ananthanarayanan et al. | 713/182 |
| 2007/0100812 | A1 * | 5/2007 | Simske et al. | 707/5 |
| 2007/0106662 | A1 * | 5/2007 | Kimbrough et al. | 707/5 |

OTHER PUBLICATIONS

Bonatti et al. ("An Algebra for Composing Access Control Policies", Feb. 2002, ACM Transactions on Information and System Security, vol. 5, No. 1, pp. 1-35).*
U.S. Appl. No. 11/368,130, filed Mar. 3, 2006, Chang et al.

(Continued)

*Primary Examiner*—Tim T. Vo
*Assistant Examiner*—Jeremy D Engelskirchen
(74) *Attorney, Agent, or Firm*—Fish & Richardson P.C.

(57) ABSTRACT

In general, a genre classification can be determined for a document, the genre classification including multiple terms and corresponding scores indicating confidence levels for the terms with respect to the document. A relevant node in a document control policy ontology can be identified in accordance with the genre classification, and a confidence level for applicability of the relevant node can be assessed based at least in part upon at least one of the scores. A parent node of the relevant node in the document control policy ontology can be selected to stand in for the relevant node if the assessed confidence level for applicability of the relevant node falls below a threshold. At least one document control policy can be recommended to govern access to the document based on the identified or selected relevant node in the document control policy ontology.

30 Claims, 3 Drawing Sheets

OTHER PUBLICATIONS

DIAD, DolphinSearch Intelligent Archive Director, Fact Sheet, 2005, DolphinSearch, Inc.

Donald S. Skupsky in "Records Retention Procedures: Your Guide to Determine How Long to Keep Your Records and How to Safely Destroy Them!", published by Information Requirements Clearinghouse (Mar. 1990).

DIAD, DolphinSearch Intelligent Archive Director, Fact Sheet, 2005, DolphinSearch, Inc.

* cited by examiner

SYSTEM AND METHOD OF DETERMINING AND RECOMMENDING A DOCUMENT CONTROL POLICY FOR A DOCUMENT

BACKGROUND

The present disclosure relates to identifying an appropriate document control policy for a given document.

Document control policies include both document access policies and document retention policies. A document security policy is a common example of a document access policy. A document security policy is an instance within a framework of rules within which an organization establishes needed levels of document information security to achieve specific desired confidentiality and privacy goals. A policy is a statement of rights and privileges as applied to document content, and any other constraints that may be assigned and applied to a document. A document security policy is typically described and/or implemented by a DRM (Digital Rights Management) system.

A document retention policy is an instance within a formalized policy of an organization for the preservation of data, especially electronic documents. Related to this is a document data destruction policy, which is an instance within a formalized policy of an organization for the destruction/expiration of data, especially electronic documents. A document data destruction policy is a type of document retention policy. Document retention policies are typically implemented by a records archive system.

When a document is created, a user typically either manually enforces document retention and security policies, or a DRM system is used (where manual intervention for new unknown documents is often required). Another approach relies on an Information Technology Workflow/Content Management System (ITW/CMS) to help select, assign and enforce appropriate policies. Such workflows and systems are often highly customized, developed specifically for the particular business practices of a company, and employ a classification system that tightly integrates security and retention policies with pre-defined document categories.

SUMMARY

This specification describes technologies relating to identifying an appropriate document control policy for a given document. In general, one aspect of the subject matter described in this specification can be embodied in a method that includes determining a genre classification for a document, the genre classification including multiple terms and corresponding scores, each score for a term indicating a confidence level for the term with respect to the document; identifying a relevant node in a document control policy ontology by comparing the genre classification with the document control policy ontology; assessing a confidence level for applicability of the relevant node based at least in part upon at least one of the scores; selecting a parent node of the relevant node in the document control policy ontology to stand in for the relevant node if the assessed confidence level for applicability of the relevant node falls below a threshold; and recommending at least one document control policy to govern access to the document based on the identified or selected relevant node in the document control policy ontology.

The determining can include classifying the document using a document genre ontology including a hierarchical knowledge structure containing a vocabulary of terms and concepts, and inference chains representing interrelationships between the vocabulary terms and concepts, for document genre classification; the genre classification can include a subset of the inference chains; and the identifying can include checking terms associated with levels higher than a lowest level of respective ones of the subset of inference chains. The method can further include deriving a document control policy for a parent node in the document control policy ontology based on a combination of multiple document control policies associated with child nodes of the parent node in the document control policy ontology; and associating the derived document control policy with the parent node in the document control policy ontology.

The derived document control policy can include a derived security policy and a derived retention policy, and deriving the document control policy can include combining Boolean values of security policies associated with the child nodes of the parent node to form the derived security policy; and combining identified separate cases, which depend on variables associated with the multiple document control policies associated with child nodes, to form the derived retention policy. The deriving can include deriving a document control policy that aggregates policy components, defaulting to more conservative policy components, from the multiple document control policies associated with the child nodes in the document control policy ontology. Moreover, the deriving can include recursively deriving document control policies for parent nodes in the document control policy ontology up to a root node; and the deriving and the associating can be performed before deployment of the document control policy ontology.

The recommending can include outputting multiple recommended document control policies and corresponding inference chains from the document control policy ontology. The method can further include automatically applying a highest ranked document control policy, from multiple recommended document control policies, to the document.

Other embodiments of the above aspect include corresponding systems, apparatus, and computer program products. For example, a system can include a user interface device; a document control component including a hierarchical knowledge structure including document control policies, including at least one document control policy inherited by a parent node in accordance with an algebraic maximum of rules associated with child nodes of the parent node; and one or more computers operable to interact with the user interface device and the document control component to determine a genre classification for a document, compare the genre classification with the hierarchical knowledge structure to identify a relevant node among multiple nodes, including the parent node, and recommend at least one document control policy to govern access to the document based on the identified relevant node in the hierarchical knowledge structure. The one or more computers can include one personal computer, and the personal computer can include the user interface device.

The one or more computers can include a server operable to interact with the user interface device through a data communication network, and the user interface device can be operable to interact with the server as a client. The system can further include a document genre ontology used for document genre classification, the document genre ontology including a hierarchical knowledge structure containing a vocabulary of terms and concepts, and inference chains representing interrelationships between the vocabulary terms and concepts; an application program interface (API) configured to provide the document control component with access to selected elements in an inference chain in the document genre ontology; wherein the document control component includes a policy ontology component configured to recommend the at least one document control policy and including an interface through which a policy management component accesses the at least one document control policy for application to the document. The policy management component can include a policy server, and the programmatic interfaces can employ XML (eXtensible Markup Language) and an XML-schema (XSD) for data interchange.

Particular embodiments of the subject matter described in this specification can be implemented to realize one or more of the following advantages. Hierarchical knowledge structures can be used to automatically classify a document, and then recommend and apply appropriate document security and retention policies. Security and retention policies can be automatically located and recommended based on document genre (e.g., document category or type), and an enterprise can use these systems and methods to automate the process of securing and retaining their documents.

Genre generalizations about a document can be made in order to recommend one or more likely policies that should be applied. The ability to generalize the genre classification with respect to a hierarchical knowledge structure containing document control policies can at least partially decouple the hierarchical representation used in document classification from the hierarchical representation used to identify document control policies. This allows the system and method to be readily used in real-world business environments, where both the human and machine agent can fail to make a highly precise determination of an exact type or category of a given document.

Useful and correct policies can be located without the need for extensive human intervention or perfect automatic document classifiers. The time consuming and often error-prone manual process, and manually-assisted DRM, can be avoided, and an appropriate document control policy can be automatically selected and applied to a document, irrespective of the knowledge and capabilities of the user generating the document. Furthermore, in businesses where security and retention policies are incompletely specified, generalizations and inferences about related document genres can be automatically made to find suitable candidate policies. This can be of particular value for corporations dealing with government regulations (e.g., the Sarbanes-Oxley Act of 2002) that affect obligations to secure, protect and archive business documents.

Moreover, the system is flexible in that new security and retention policies can be readily added and enforced, and new document types can be readily added to a document classification system, without such separately made changes causing incompatibilities in the intersection of the two categorizations at the time of policy determination. The use of a classifier that returns document genre categories within a hierarchical category structure can allow for more tolerance of minor errors or mis-classifications by using more generic parent classifications, which have more conservative rules but are still correct.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
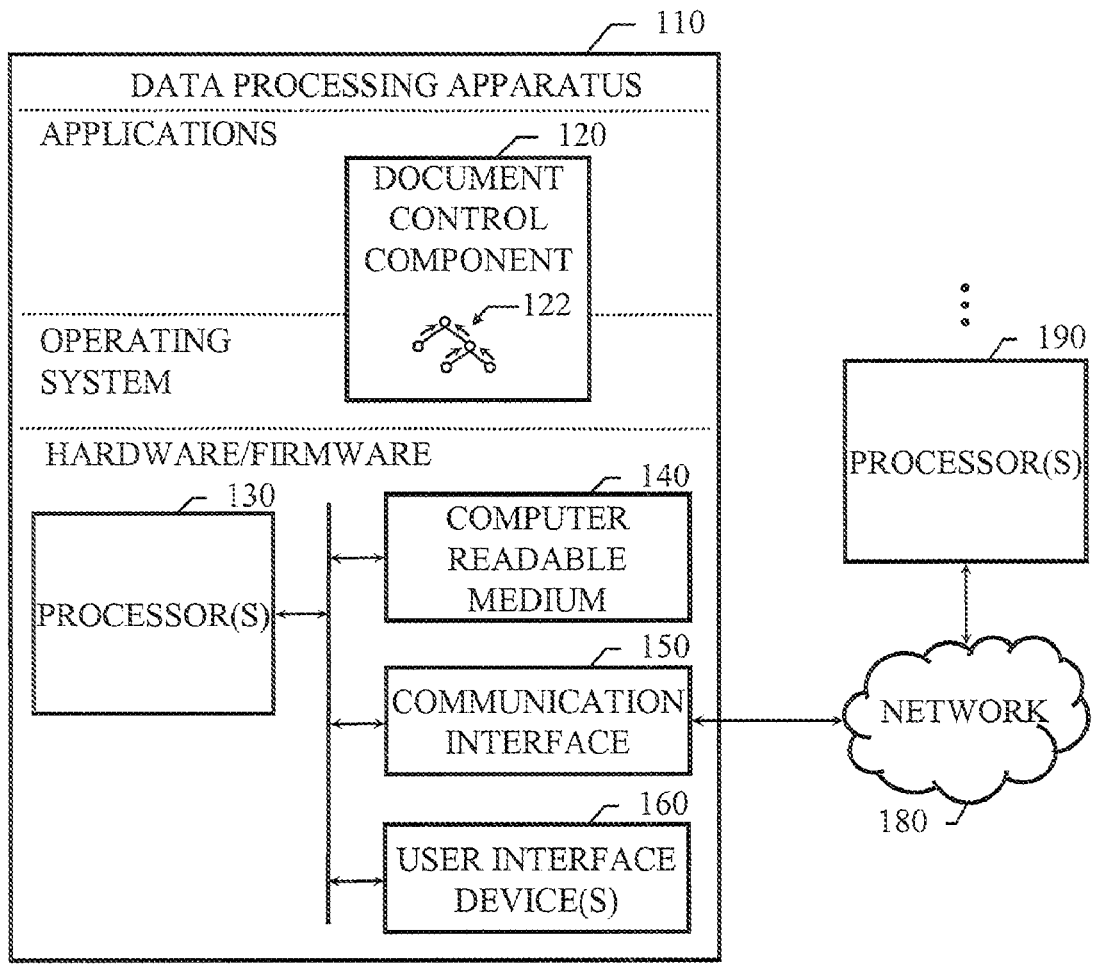
FIG. 1 shows an example system configured to automatically determine and recommend a document control policy.

FIG. 1 shows an example system configured to automatically determine and recommend a document control policy. A data processing apparatus 110 can include hardware/firmware, an operating system and one or more applications, including a document control component 120. The document control component 120 can be part of a document handling application (e.g., Adobe® Acrobat® software, available from Adobe Systems Incorporated of San Jose, Calif.) or a workflow engine (e.g., Adobe® LiveCycle™ Policy Server software). Moreover, the document control component 120 can be part of a larger document handling system, such as an enterprise workflow system, a resource management system (e.g., an enterprise relationship management (ERM) system or a customer relationship management (CRM) system), or a content management system (e.g., a document repository or document archiving system).

As used herein, an "application" refers to a computer program that the user perceives as a distinct computer tool used for a defined purpose. An application can be built entirely into the operating system (OS) of the data processing apparatus 110, or an application can have different components located in different locations (e.g., one portion in the OS or kernel mode, one portion in the user mode, and one portion in a remote server). Moreover, an application can be a graphical user interface application (e.g., a Web browser) that connects to one or more processors 190 (e.g., one or more Web servers) over a network 180 and provides the computer tool as a network service.

The document control component 120 includes a hierarchical knowledge structure 122 including document control policies. The hierarchical knowledge structure 122 can be a document control policy ontology, with multiple policies that specify control parameters including security access restrictions and document retention specifications. The hierarchical knowledge structure 122 includes at least one document control policy inherited by a parent node in accordance with an algebraic maximum of rules (e.g., DRM or retention rules) associated with child nodes of the parent node. In general, this involves deriving a document control policy (for a parent node) that aggregates policy components (from multiple document control policies associated with the child nodes) while defaulting to more conservative (more general) policy components. A detailed example process for determining the algebraic maximum is described further below.

The data processing apparatus 110 includes one or more processors 130 and at least one computer-readable medium 140. The data processing apparatus 110 can also include a communication interface 150, and one or more user interface devices 160. The user interface device(s) 160 can include display screen(s), keyboard(s), mouse, stylus, or any combination thereof. Moreover, the data processing apparatus 110 (or another data processing apparatus accessible over the network 180) can itself be considered a user interface device (e.g., when the document control component 120 is accessible in connection with an application delivered as a Web service).

Once properly programmed, the data processing apparatus 110 is operable to determine a genre classification for a document, compare the genre classification with the hierarchical knowledge structure 122 to identify a relevant node among multiple nodes, including the parent node, and recommend at least one document control policy to govern access to the document (e.g., use and retention restrictions for the document) based on the identified relevant node in the hierarchical knowledge structure 122. Additionally, the data processing apparatus 110 can be one of many apparatus, communicatively coupled through the network 180, that are operable (in conjunction with each other) to perform the described operations. Thus, it will be appreciated that the document control component 120 can be provided as a server-based resource to the apparatus 110, and the document control component 120 can have multiple sub-components, which can be distributed among different computing systems on a network in various implementations.

Figure 2:
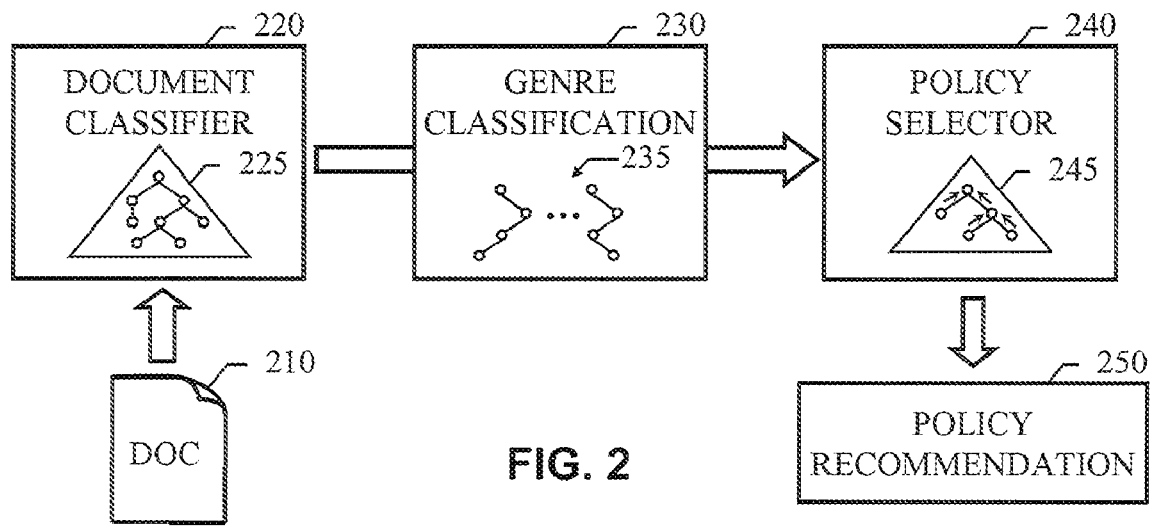
FIG. 2 shows an example workflow for automatically determining and recommending a document control policy.

FIG. 2 shows an example workflow for automatically determining and recommending a document control policy. An electronic document 210 (which for brevity will simply be referred to as a document) can be provided to a document classifier 220. The document 210 can be any set of information that includes terms usable in classifying the document 210. The document 210 does not necessarily correspond to a file; a document may be stored in a portion of a file that holds other documents, in a single file dedicated to the document in question, or in multiple coordinated files.

The document classifier 220 processes the document 210 to determine a genre classification 230 for the document 210. The document classifier 220 can do this automatically for any given document based on a provided knowledge structure (e.g., automatically classify a document against a document type tree). For example, the document classifier 220 can have an associated document genre ontology 225 including a hierarchical knowledge structure containing a vocabulary of terms and concepts, and inference chains representing inter-relationships between the vocabulary terms and concepts, for document genre classification. The document genre ontology 225 can be built and accessed using publicly available document classifier technology, or using the techniques described in U.S. patent application Ser. No. 11/368,130, filed Mar. 3, 2006 and entitled "SYSTEM AND METHOD OF BUILDING AND USING HIERARCHICAL KNOWLEDGE STRUCTURES", which is hereby incorporated by reference in its entirety.

As used herein, the term "genre" is used to cover both document category information (e.g., topical categories, such as earnings, Photoshop, and features) and document type information (e.g., workflow type, such as product specification, product brochure, resume, invoice, and financial report). Thus, a genre includes subject matter related classifications as well as document classifications characterized by document style, form, or role within an enterprise.

The document classifier 220 can be local (e.g., on the same machine) or remote (e.g., on another machine accessible through a network) with respect to a source for the document 210. Thus, the document classifier 220 can be built in to the software handling the document 210, or the document classifier 220 can be a server application providing document classification services upon request. The document classifier 220 can be a multi-labeled classifier that provides a collection of attributes that are relevant to the available genres, and the genre classification 230 can represent multiple, ranked document genres.

The document classification process can be fuzzy in the sense that an exact classification for a document need not be determined. The scores of various possible exact classifications can be provided in the genre classification 230, and in any event, the genre classification 230 will indicate at least a general genre for the document. For example, the document classifier 220 may identify a document as belonging to a first subgenre with 40% confidence, and belonging to a second subgenre with 30% confidence, but then the document also belongs to the parent genre of the first and second subgenres with 70% confidence. Selection of the parent genre results in the use of a more conservation (but still correct) rule and a significant improvement over use of either of the lower likelihood child subgenres. Furthermore, the list of candidate genres and associated scores can be generated by the document classifier 230 in accordance with the statistical methods used to determine the relevance of a category or term to an unknown document, as described in U.S. patent application Ser. No. 11/368,130.

Once a genre classification 230 is determined for the document 210, the genre classification 230 can be sent to a policy selector 240, which may also be local or remote with respect to either the document source or the document classifier. The generated genre classification 230 can include multiple terms and corresponding scores, each score for a term indicating a confidence level for the term with respect to the document 210. For example, the generated genre classification 230 can be an XML (eXtensible Markup Language) document that includes information identifying the document 210, the candidate genres, and associated scores.

The genre classification 230 can include a subset 235 of the inference chains in the document genre ontology 225. Each of these inference chains can enumerate an entire chain in the document classifier ontology from leaf to root (as shown in FIG. 2). Thus, the inferencing done by the document classifier 220 can be transferred to the policy selector 240, which can decide whether and how to use this information. For instance, if a particular classifier result inference chain has a leaf node (the first label) that isn't found anywhere in the control policy ontology, then the policy selector can step up to the parent label in the source inference chain, and use this label to search the policy ontology; this process can be repeated until a match is found or the beginning of the inference chain is reached and no match is found, in which case any rules associated with the root node can be applied. In addition, although the inference chains in the subset 235 are shown separately in FIG. 2, it should be appreciated that these inference chains can be provided together in one structure (e.g., a single tree enumerating a multi-faceted document classification 230).

The policy selector 240 can be implemented in a document security and retention policy server, such as the Adobe® LiveCycle™ Policy Server software, available from Adobe Systems Incorporated of San Jose, Calif. The policy selector 240 uses a second knowledge structure (e.g., a policy tree) constructed by compiling a set of document control policies (e.g., access, security and retention policies) for different document classifications. For example, the policy selector 240 can have an associated document control policy ontology 245 including a hierarchical knowledge structure in which parent nodes inherit policies derived from child nodes within the hierarchical knowledge structure.

The policy selector 240 can compare the genre classification 230 with the document control policy ontology 245 to identify a relevant node for the document 210. This can involve checking terms associated with levels higher than a lowest level of respective ones of the subset 235 of inference chains. The policy selector 240 can make a recommendation even if the genre classification 230 does not fully classify the document 210 because policies are inherited by parent nodes in the ontology 245. Thus, an appropriate parent node and a corresponding appropriate policy can be found by following inference chains up the knowledge structure until a specified confidence level (threshold) is met. At a minimum, the document 210 falls under the root node, in which case, the document 210 is a generic document and the root node's policy is selected.

Since the policy selector 240 can look for correlation between the two knowledge structures, including at levels other than the leaf nodes, there need not be a direct correspondence between the knowledge structure used by the document classifier 220 and the knowledge structure used by the policy selector 240. In fact, the systems of classification used by the document classifier 220 and the policy selector 240 can be different systems built by different people with different objectives in mind. Note that often an enterprise will develop multiple document classification ontologies, rather than just one (e.g., a different ontology for each business department). Nonetheless, the genre classification 230 can be compared with the document control policy ontology 245 to determine an appropriate document control policy for the document 210, because the chain of relationships in the document control policy ontology 245 can be followed toward the root until an appropriate node that has a policy is found. Based on this comparison, the policy selector 240 can make a policy recommendation 250, which can be a single policy or multiple policies (e.g., a ranked list of possible policies to apply to the document).

Figure 3:
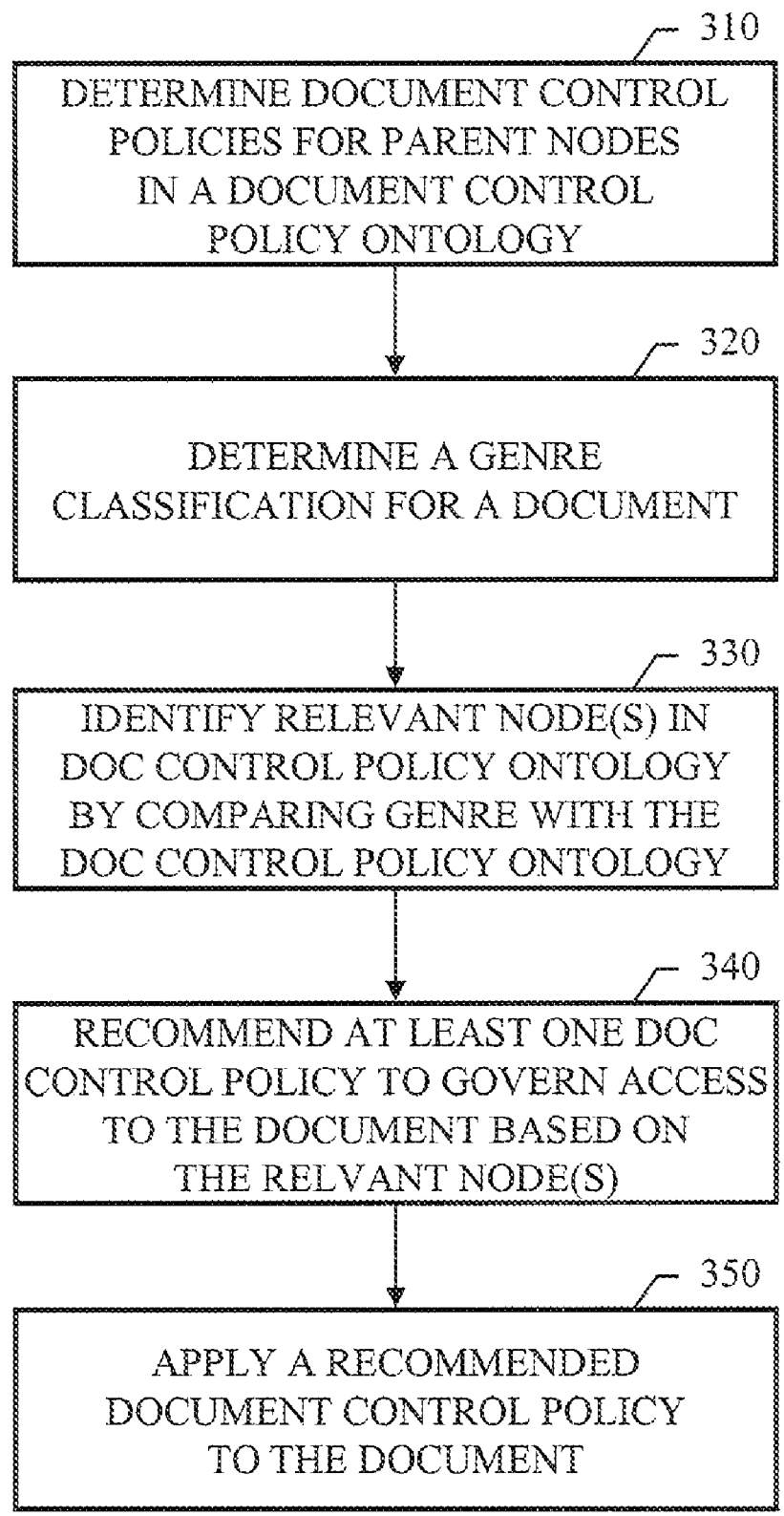
FIG. 3 is a flowchart showing an example process of determining, recommending and applying a document control policy to a document.

FIG. 3 is a flowchart showing an example process of determining, recommending and applying a document control policy to a document. Document control policies are determined 310 for parent nodes in a document control policy ontology. This can be done as a pre-processing operation, where the parent nodes of a policy tree can be populated with document control policies derived from child nodes, or this can be done actively during runtime.

The policy ontology can be provided by a third party, and includes policy information at leaf nodes, which can be propagated up the hierarchy such that a policy at a parent node is at least as conservative as the policies at the parent node's child nodes. This propagation of policies up the ontology hierarchy can be understood as an algebraic DRM and retention policy compilation of a seed ontology. The augmented policy ontology can organize all of the document genres for a given enterprise and associate security and retention policies for each document genre within the ontology.

When document genres and their policies are arranged into such an ontology structure, automatic generalizations (known as inferences) can be made to determine which policies should be applied to the new unknown document in question. For example, one branch of the policy ontology may have Financial Documents as a document genre, and Annual Reports, Quarterly Reports, and Intra-Quarter Updates can all be subgenres of Financial Documents, and be organized under Financial Documents. Associated with each subgenre can be specific policies to apply to appropriate documents. When the policy ontology is constructed, for each parent document genre (e.g., Financial Documents) the most generally applicable policy (for this genre) can be automatically computed and recorded by applying a security and retention policy algebra, which considers the policies of all of the immediate children genre nodes.

The following is an example policy algebra, which can be used to compute maximum conservative policies for a given parent policy node in the policy ontology. The following process can be performed recursively and can be applied at any level in the policy ontology, although typically the process will be performed on the entire ontology, starting from the root node. The policy algebra described here is generalized to apply to both security (permission) policies and retention policies.

Security policies can specify permission restrictions expressed as a Boolean value indicating whether the operation is allowed or not allowed. For example, the restrictable operations can include (1) Printing, (2) Changing the Document, (3) Document Assembly, (4) Content Copying or Extraction, (5) Content Extraction for Accessibility, (6) Commenting, (7) Filing of Form Fields, (8) Signing, and (9) Creation of Template Pages. The set of Boolean permissions for the restrictable operations can be represented as a bit vector, where one such vector is associated with each document genre. To compute the parent permission policy for all document genres under a parent genre, the permission bit vectors for the child nodes can be combined (e.g., bit-wise AND'ed), and the resulting bit vector can be assigned to the parent level. Thus, if the classifier is not able to resolve document genre classification to one of the children nodes in the policy ontology, the closest parent node is identified, and the parent permission vector results in the most conservative permissions (for the portion of the ontology under the parent node) being applied to the document.

A retention policy for a document is generically defined as a point in time, a duration, and an action. For specifying a policy, the point in time is typically the current date, designated by "C", a duration is the number years the document is to be retained, designated by "N", and an action indicates an optional procedure that must be undertaken at the end of the duration (typically nothing, or the destruction of the document.) For example, the document retention policies can use at least portions of the coding system described by Donald S. Skupsky in "Records Retention Procedures: Your Guide to Determine How Long to Keep Your Records and How to Safely Destroy Them!", published by Information Requirements Clearinghouse (March 1990).

For retention policies, the Skupsky method developed by Donald S. Skupsky provides a formal specification of how to organize and apply information to determine the retention periods of different records. The Skupsky method manually relates large numbers of predefined laws with defined groupings of large numbers of records to determine the appropriate retention periods to apply to these records. This manual methodology has been incorporated into products such as Retention Manager software, provided by Information Requirements Clearinghouse of Greenwood Village, Colo., as well as into some Content Management Systems such as the Records Manager software, provided by Interwoven Inc. of Sunnyvale, Calif. Similarly, the Skupsky method can be leveraged in various implementations of the subject matter described in this specification.

In general, for any retention policy, three symbols can be defined to indicate different points in time: C=current year; T=the point in time of termination for a document (expiration, employment, etc.); and S=the point in time that a document is superseded. Some example Retention Policies are:

C+3: retain document for 3 years after current year

T+5: retain contract document for 5 year after termination

T+10: retain resume document for 10 years after termination of employment

S: retain document until superseded

P: designates C+infinity (retain document permanently)

Given this set of variables, a safe (maximally conservative) policy can be found for a homogeneous set of symbols. In particular: max(C+1,C+2,C+7,C+4)=C+7. In general, a safe policy can be found according to max(Ci), where i=1 . . . M, and M=number of children C+Ni policies. Also, a safe policy can be found according to max(Ti), where i=1 . . . M, and M=number of children T+Ni policies.

A complication arises when symbols are heterogeneous, such as when computing max(C+2,T+4,C+3,T+5). In this case, the maximal conservative policy can be determined by using a retention policy algebra to simplify this expression by determining the maximum policy between terms. To compute max(C+A,T+B) (where A and B are different durations), implies answering:

$$C+A=T+B?$$

$$C=T+B-A?$$

$$C-T+A-B=0$$

Three cases arise:

$$C-T+A-B: \begin{matrix} <0 & T+B \text{ is the max} \\ =0 & C+A \text{ and } T+B \text{ are equal} \\ >0 & C+A \text{ is the max} \end{matrix}$$

Thus, a generalized retention policy can be formed from the identified separate cases, which depend on variables associated with the source policies.

This policy evaluation method can be generalized for other symbol types with new, specific retention semantics. This policy algebra approach allows a policy ontology structure to be pre-computed and used to make generalizations about a policy. Thus, accurate policy recommendations can be obtained even while imperfect document genre classifications are tolerated. During policy compilation, the retention algebra described above can be used to recursively work from the leaf nodes of the policy specification up to the more generic document genres, assigning the most conservative policy to successively higher nodes in the ontology. An example of the output of this process is shown below.

Example Retention Policy Ontology (Generated by Compiling a Seed Policy Ontology)

Key:

RP(x)=Retention Policy (x)

C=Current year

T=At time of termination (contract, employment, etc.)

S=Until document superseded

P=Permanent

+N=event plus N years

Example: RP(C+4)=retain document for 4 years after current year

The seed ontology in this example includes DRM and retention rules at the leaf nodes. The algebraic compilation process builds on this seed ontology by considering groups of nodes together with a common parent node to determine the algebraic maximum DRM and retention rule to assign to that parent node using the methods described above. This process can be repeated recursively until the root node is reached, and the rule at each node can be expressed using the functional notation described above (e.g., in XML).

In some cases, policies that are compiled for a parent node may conflict with each other. In some enterprises, there is a hard rule that a given type of document must be destroyed after a set amount of time. This type of rule would conflict with a rule that says retain the document until the current year plus ten. In this case, the fact that there are two conflicting rules can just be recorded in the policy ontology, elsewhere, or in a combination of these. For example, the fact that conflicting rules were encountered, and the relevant rules, can be recorded in a log or audit trail in symbolic form so a user can see that a conflict situation was encountered. Likewise, if a policy cannot be evaluated due to a lack of information (e.g., if the policy says retain the document for ten years after the contract terminates, but the contract termination date is unknown) then the information that is known can be recorded in the policy ontology (e.g., "RP(T+10)"). Since such information is recorded and propagated, the policy can be fully evaluated once the missing information is received or the rule conflict is resolved. Note that the system can be configured to automatically resolve conflicting rules when possible.

Referring again to FIG. 3, a genre classification is determined 320 for a document. A symbolic or machine-trained document classifier can be used to automatically classify a new unknown document. The output of this classification can be a predefined categorization structure, which can include multiple inference chains from the knowledge structure used by the document classifier. The predefined categorization structure represents the genre classification in that it can present document terms and corresponding scores within the context of the hierarchy of the classifier's knowledge structure, which can assist in the comparison to the policy ontology. In essence, the document genre classification represents a set of possible genres for the document and associated confidence levels for those genres.

It should be noted that this genre classification may be imprecise. For example, the classifier may only be able to determine the general type of the document (e.g., Financial Document), and not the specific subtype (e.g., Annual Report). Further, the classifier may determine a genre of documents that does not yet have an explicit security or retention policy assigned to it.

One or more relevant nodes are identified 330 in the document control policy ontology by comparing the genre classification with the document control policy ontology. The policy ontology can be used to locate all appropriate policies that should be applied to the document. When a document genre (computed by the document classifier) directly matches a document genre or subgenre in the policy ontology, if policies were associated with that document genre, one or more policies associated with the matched document genre can be obtained and applied.

If the classifier is unable to make a sufficiently precise classification, and indicates a more general document genre (i.e., a non-leaf node in the policy ontology), the aggregated policy for that more general document genre can be obtained and applied. Since the child document genre policies can be aggregated into a parent genre in accordance with a conservative policy reduction algebra, a correct policy can be provided for each document (albeit possibly a more conservative policy than is strictly needed).

In addition, if the classifier identifies a document genre which does not have an immediate or explicit policy, the policy ontology can be used to generalize about the document genre. This generalization process can be performed by following the links between child and parent genres in the policy ontology to each successive parent document genre until a genre with an associated policy is found. The list of parent genres formed by following these links is called an inference chain, and the present system and method can use these inference chains to make successive generalizations about the document genres until policies are found.

Figure 4:
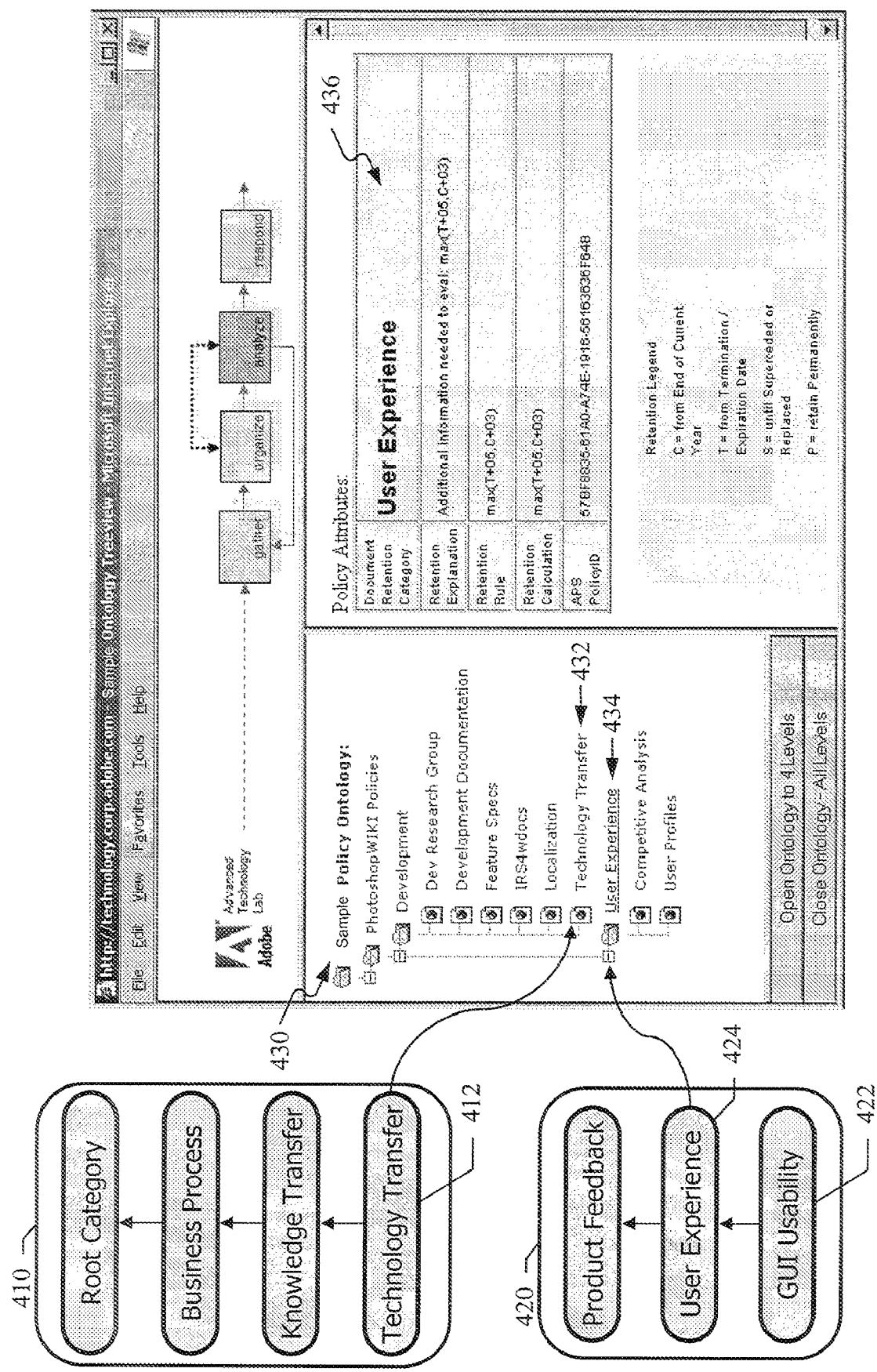
FIG. 4 shows two example classifier inference chains compared with an example policy ontology.

FIG. 4 shows two example classifier inference chains 410 and 420 compared with an example policy ontology 430. The inference chains 410 and 420 are represented schematically in FIG. 4. The policy ontology 430 is represented in a Web browser based Graphical User Interface (GUI) usable to view and navigate a policy ontology. It should be appreciated that the same GUI, or a similar GUI, can also be used to view and navigate the classification ontology used by the document genre classifier.

A document genre classifier classifies a document and returns an inference chain 410. Each label in the chain can be used (in turn, starting from the bottom) to look up a matching label in the policy ontology 430. Thus, the first label "Technology Transfer" in node 412 is used to search the policy ontology 430. A matching label "Technology Transfer" is found in node 432 of the policy ontology 430. The process can then terminate, and retention and DRM policy information (not shown) associated with the node 432 can be used to recommend a policy for the document.

In the second example, an inference chain 420 is returned by the document classifier. The first label "GUI Usability" in node 422 is used to search the policy ontology 430, and no matches are found. The search proceeds up the chain to the label "User Experience" in node 424, which is used to search the policy ontology 430. A matching label "User Experience" is found in node 434, and the retention and DRM policy information 436 associated with the node 434 is returned.

Inferencing within a policy ontology to make successive generalizations about the document genres can be performed in different manners in various implementations. When a match from the document classifier ontology into some entry point node into the policy ontology is obtained, the inferencing process allows the more conservative (and appropriate) rule to be found. Traveling from a child node up one level to a parent node is an inference (a generalization of that child node to a more general genre). Traveling to the next parent node represents another inference, and the policy found at this node has the maximum conservative rule among all the child nodes of this grandparent node. Thus, the initial classification can be somewhat inaccurate, but as one moves higher up the inference chain in the policy ontology, one finds more conservative policies, which then have a higher likelihood of being correct.

In general, an inference can be drawn if the lowest level classification is not trusted. For example, if a document classifier indicates a document is an Annual Report with 30% confidence, all the other identified genres have much lower confidence, and 30% does not meet a predefined confidence threshold (e.g., 50%), then the method can go up one level in the policy ontology to find a more general policy. The number of inferences to draw before deciding on a policy can be fixed (e.g., go up one level only) or dependent on the scores in the genre classification provided. In a typical usage scenario, the classifier returns one inference chain; each label in the chain is used to search the policy ontology until a match is found; if there are no matches, the process ends, and the root node of the policy ontology is used (if policies are assigned at the root level).

At least one document control policy is recommended 340 to govern access to the document based on the relevant node(s). The likelihood of various identified policies can be determined using the scores associated with the candidate genres (as provided by the document classifier). Recommending one or more identified policies can involve outputting multiple recommended document control policies, associated scores and corresponding inference chains from the document control policy ontology (e.g., in an XML document). These recommended policies, scores and inference chains can then be viewed by a user (or processed further by another machine) in the course of selecting the best policy to apply. Alternatively, a best applicable policy can be selected and recommended. In any event, the best applicable policy can be identified and used as the default policy to apply. Then, a recommended document control policy can be applied 350 to the document. For example, a highest ranked document control policy, from multiple recommended document control policies, can be applied automatically to the document, without human intervention.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, although separate ontologies are described for use in document classification and policy selection, it should be appreciated that these ontologies can be combined into a single hierarchical knowledge structure, such as a hybrid or multi-faceted ontology.

In addition, other embodiments include various integrations with various enterprise systems. For example, the systems and techniques described can be use with an electronic mail system to help prevent leakage of intellectual property, i.e., documents inside a company intranet make their way outside of the company through e-mail attachments in an unauthorized manner. In these embodiments, headers in packets on a network can be sampled to determine when a document is being transferred. The document can be assembled and classified to then determine the classification inference chain. A general policy ontology can be used to determine if the document should be secured with DRM and/or retention policies, and a mechanism such as Adobe® Policy Server software can then be used to apply the policy so that even if the document leaves the enterprise intranet, the correct DRM or retention policies are applied (e.g., in the DRM case, the document is encrypted.)

In a variation of these ideas, all documents can also be automatically classified and the classification inference chain can be saved as metadata in a secure way within the document. Services such as an e-mail system can then check this classification inference chain and use the algorithm described above to find the appropriate retention and DRM policy. This policy can then be applied to the document by Adobe® Policy Server software before being attached to outgoing e-mail.

Still further embodiments are within the scope of the following claims.

What is claimed is:

1. A computer-implemented method comprising:
   determining a genre classification for a document, the genre classification comprising multiple terms and corresponding scores, each score for a term indicating a confidence level for the term with respect to the document;
   accessing a stored document control policy ontology, the document control policy ontology comprising a hierarchy of nodes that represent document genres and have corresponding document control policies;

identifying an entry point node in the hierarchy of nodes of the document control policy ontology by successively comparing the multiple terms in the genre classification with the nodes in the document control policy ontology in order of increasing hierarchical position of the terms until either a matching node in the ontology is found or the term in the highest hierarchical position of the multiple terms is reached and no matching node is found in which case a document control policy corresponding to a root node is used the identifying comprising, when the document control policy ontology has an underlying classification structure different from a classification structure used for determining the genre classification, identifying a correlation between the different classification structures;

assessing a confidence level for applicability of the entry point node based at least in part upon at least one of the scores;

inferencing within the document control policy ontology to find a document control policy more conservative than the policy corresponding to the entry point node, the inferencing comprising selecting a parent node of the entry point node in the document control policy ontology to stand in for the entry point node if the assessed confidence level for applicability of the entry point node falls below a threshold, the parent node inheriting at least one document control policy derived from at least the entry point node; and outputting, to a hardware device, a recommendation that identifies at least one document control policy to govern access to the document based on the identified entry point node or the selected parent node in the document control policy ontology.

2. The method of claim 1, wherein the determining comprises classifying the document using a document genre ontology comprising a hierarchical knowledge structure containing a vocabulary of terms and concepts, and inference chains representing interrelationships between the vocabulary terms and concepts, for document genre classification, the genre classification comprises a subset of the inference chains, and the identifying comprises checking terms associated with levels higher than a lowest level of respective ones of the subset of inference chains.

3. The method of claim 1, further comprising deriving a document control policy for a parent node in the document control policy ontology based on a combination of multiple document control policies associated with child nodes of the parent node in the document control policy ontology, and associating the derived document control policy with the parent node in the document control policy ontology.

4. The method of claim 3, wherein the derived document control policy comprises a derived security policy and a derived retention policy, and deriving the document control policy comprises:

combining Boolean values of security policies associated with the child nodes of the parent node to form the derived security policy; and combining identified separate cases, which depend on variables associated with the multiple document control policies associated with child nodes, to form the derived retention policy.

5. The method of claim 3, wherein the deriving comprises deriving a document control policy that aggregates policy components, defaulting to more conservative policy components, from the multiple document control policies associated with the child nodes in the document control policy ontology.

6. The method of claim 3, wherein the deriving comprises recursively deriving document control policies for parent nodes in the document control policy ontology up to a root node; and wherein the deriving and the associating are performed before deployment of the document control policy ontology.

7. The method of claim 1, wherein the outputting comprises outputting, to the hardware device, multiple recommended document control policies and corresponding inference chains from the document control policy ontology.

8. The method of claim 1, further comprising automatically applying a highest ranked document control policy, from multiple recommended document control policies, to the document.

9. The method of claim 1, further comprising:

when the term in the highest hierarchical position in the genre classification is reached and the root node is used, outputting to a hardware device a recommendation that identifies at least the document control policy corresponding to the root node to govern access to the document.

10. The method of claim 1, further comprising:

generalizing about document genre when the genre classification matches a node in the document control policy ontology that lacks an associated policy, the generalizing including traversing a link between the matching node and successive parent nodes until an associated policy is found.

11. A system comprising:

a user interface device;

a document control component comprising a hierarchical knowledge structure including document control policies, including at least one document control policy inherited by a parent node in accordance with an algebraic maximum of rules associated with child nodes of the parent node; and one or more computers operable to interact with the user interface device and the document control component to determine a genre classification for a document, compare the genre classification with the hierarchical knowledge structure to identify a relevant node among multiple nodes, including the parent node, and recommend at least one document control policy to govern access to the document based on the identified relevant node in the hierarchical knowledge structure, the relevant node identified by successively comparing multiple terms in the genre classification with the hierarchical knowledge structure based on hierarchical positions of the terms until either a matching node in the hierarchical knowledge structure is found or the term in the highest hierarchical position of the multiple terms is reached and no matching node is found in which case a document control policy corresponding to a root node is used, and when the hierarchical knowledge structure of the document control component differs from a hierarchical knowledge structure used for determining the genre classification, the one or more computers being operable to identify a correlation between the different knowledge structures.

12. The system of claim 11, wherein the one or more computers comprise a sewer operable to interact with the user interface device through a data communication network, and the user interface device is operable to interact with the server as a client.

13. The system of claim 11, wherein the one or more computers comprises one personal computer, and the personal computer comprises the user interface device.

14. The system of claim 11, further comprising:
a document genre ontology used for document genre classification, the document genre ontology comprising a hierarchical knowledge structure containing a vocabulary of terms and concepts, and inference chains representing interrelationships between the vocabulary terms and concepts;
an application program interface (API) configured to provide the document control component with access to selected elements in an inference chain in the document genre ontology;
wherein the document control component comprises a policy ontology component configured to recommend the at least one document control policy and including an interface through which a policy management component accesses the at least one document control policy for application to the document.

15. The system of claim 14, wherein the policy management component comprises a policy server.

16. The system of claim 11, the one or more computers further operable to derive a document control policy for a parent node in the hierarchical knowledge structure, in the document control component, based on a combination of multiple document control policies associated with child nodes of the parent node in the hierarchical knowledge structure of the document control component; and to associate the derived document control policy with the parent node in the hierarchical knowledge structure of the document control component.

17. The system of claim 11, the one or more computers further operable to output multiple recommended document control policies and corresponding inference chains from the hierarchical knowledge structure in the document control component.

18. The system of claim 11, the one or more computers further operable to automatically apply a highest ranked document control policy, from multiple recommended document control policies, to the document.

19. The system of claim 11, the one or more computers farther operable to perform operations comprising:
when the term in the highest hierarchical position in the genre classification is reached and the root node is used, recommending at least the document control policy corresponding to the root node to govern access to the document.

20. The system of claim 11, the one or more computers further operable to perform operations comprising:
generalizing about document genre when the genre classification matches a node associated with the hierarchical knowledge structure of the document control component that lacks an associated policy, the generalizing including traversing a link between the matching node and successive parent nodes until an associated policy is found.

21. A computer program product, encoded on a machine-readable storage device, configured to cause one or more data processing apparatus to perform operations comprising:
receiving a genre classification for a document, the genre classification comprising multiple terms and corresponding scores, each score for a term indicating a confidence level for the term with respect to the document;
accessing a stored document control policy ontology, the document control policy ontology comprising a hierarchy of nodes that represent document genres and have corresponding document control policies;
identifying an entry point node in the hierarchy of nodes of the document control policy ontology by successively comparing the multiple terms in the genre classification with the nodes in the document control policy ontology in order of increasing hierarchical position of the terms until either a matching node in the ontology is found or the term in the highest hierarchical position of the multiple terms is reached and no matching node is found in which case a document control policy corresponding to a root node is used the identifying comprising, when the document control policy ontology has an underlying classification structure different from a classification structure used for determining the genre classification, identifying a correlation between the different classification structures;
assessing a confidence level for applicability of the entry point node based at least in part upon at least one of the scores;
inferencing within the document control policy ontology to find a document control policy more conservative than the policy corresponding to the entry point node, the inferencing comprising selecting a parent node of the entry point node in the document control policy ontology to stand in for the entry point node if the assessed confidence level for applicability of the entry point node falls below a threshold, the parent node inheriting at least one document control policy derived from at least the entry point node; and
recommending at least one document control policy to govern access to the document based on the identified entry point node or the selected parent node in the document control policy ontology.

22. The computer program product of claim 21, wherein the determining comprises classifying the document using a document genre ontology comprising a hierarchical knowledge structure containing a vocabulary of terms and concepts, and inference chains representing interrelationships between the vocabulary terms and concepts, for document genre classification; the genre classification comprises a subset of the inference chains; and the identifying comprises checking terms associated with levels higher than a lowest level of respective ones of the subset of inference chains.

23. The computer program product of claim 21, the operations further comprising deriving a document control policy for a parent node in the document control policy ontology based on a combination of multiple document control policies associated with child nodes of the parent node in the document control policy ontology; and associating the derived document control policy with the parent node in the document control policy ontology.

24. The computer program product of claim 23, wherein the derived document control policy comprises a derived security policy and a derived retention policy, and deriving the document control policy comprises:
combining Boolean values of security policies associated with the child nodes of the parent node to form the derived security policy; and
combining identified separate cases, which depend on variables associated with the multiple document control policies associated with child nodes, to form the derived retention policy.

25. The computer program product of claim 23, wherein the deriving comprises deriving a document control policy that aggregates policy components, defaulting to more conservative policy components, from the multiple document control policies associated with the child nodes in the document control policy ontology.

26. The computer program product of claim 23, wherein the deriving comprises recursively deriving document control policies for parent nodes in the document control policy ontology up to a root node; and wherein the deriving and the associating are performed before deployment of the document control policy ontology.

27. The computer program product of claim 21, wherein the recommending comprises outputting multiple recommended document control policies and corresponding inference chains from the document control policy ontology.

28. The computer program product of claim 21, the operations further comprising automatically applying a highest ranked document control policy, from multiple recommended document control policies, to the document.

29. The computer program product of claim 21, the operations further comprising:
when the term in the highest hierarchical position in the genre classification is reached and the root node is used, recommending at least the document control policy corresponding to the root node to govern access to the document.

30. The computer program product of claim 21, the operations further comprising:
generalizing about document genre when the genre classification matches a node in the document control policy ontology that lacks an associated policy, the generalizing including traversing a link between the matching node and successive parent nodes until an associated policy is found.

* * * * *

UNITED STATES PATENT AND TRADEMARK OFFICE
CERTIFICATE OF CORRECTION

PATENT NO. : 7,610,315 B2  Page 1 of 1
APPLICATION NO. : 11/470533
DATED : October 27, 2009
INVENTOR(S) : Walter Chang and Larry Masinter It is certified that error appears in the above-identified patent and that said Letters Patent is hereby corrected as shown below:

Column 15, Line 12 at Claim 1; replace:
"a root node is used the identifying comprising, when the" with
-- a root node is used, the identifying comprising, when the --

Column 16, Line 64 at Claim 12; replace:
"computers comprise a sewer operable to interact with the user" with
-- computers comprise a server operable to interact with the user --

Column 17, Line 44 at Claim 19; replace:
"farther operable to perform operations comprising:" with
-- further operable to perform operations comprising: --

Column 18, Line 12 at Claim 21; replace:
"a root node is used the identifying comprising, when the" with
-- a root node is used, the identifying comprising, when the --

Signed and Sealed this
Fourteenth Day of June, 2011

David J. Kappos
*Director of the United States Patent and Trademark Office*